(12) United States Patent
Vega

(10) Patent No.: US 7,708,191 B2
(45) Date of Patent: May 4, 2010

(54) TELEBANKING APPARATUS FOR TRANSFERRING MONEY OR CASH VALUE BETWEEN TWO PARTIES IN THE SAME COUNTRY OR ACROSS NATIONAL BORDERS, FOR PAYING BILLS AND BROWSING THE INTERNET

(76) Inventor: Edwin Vega, 1950 Andrews Ave. South, Apt. 5F5, Bronx, NY (US) 10453

( * ) Notice: Subject to any disclaimer, the term of this patent is extended or adjusted under 35 U.S.C. 154(b) by 501 days.

(21) Appl. No.: 11/489,984

(22) Filed: Jul. 20, 2006

(65) Prior Publication Data

US 2007/0027804 A1    Feb. 1, 2007

Related U.S. Application Data

(60) Provisional application No. 60/703,353, filed on Jul. 28, 2005.

(51) Int. Cl.
G06Q 40/00    (2006.01)
G07D 11/00    (2006.01)
G07F 19/00    (2006.01)

(52) U.S. Cl. .................................................. 235/379
(58) Field of Classification Search .................. 235/379
See application file for complete search history.

(56) References Cited

U.S. PATENT DOCUMENTS

| | | | | |
|---|---|---|---|---|
| 6,798,647 | B2* | 9/2004 | Dickie | 361/679.04 |
| 6,961,237 | B2* | 11/2005 | Dickie | 361/679.04 |
| 2002/0087478 | A1* | 7/2002 | Hudd et al. | 705/64 |
| 2003/0041206 | A1* | 2/2003 | Dickie | 710/303 |
| 2004/0268005 | A1* | 12/2004 | Dickie | 710/303 |
| 2005/0143671 | A1* | 6/2005 | Hastings et al. | 600/513 |

* cited by examiner

*Primary Examiner*—Kumiko C Koyama
(74) *Attorney, Agent, or Firm*—Raymond M. Galasso; Galasso & Associates, L.P.

(57) ABSTRACT

A telebanking apparatus for performing monetary transactions from remote dispersed locations and, more particularly to apparatus for transferring cash value or monetary value between two parties, either nationally or across national borders. The telebanking apparatus is equipped to receive, store and transfer cash value to or from electronic cash value cards, credit cards, debit cards and the like, as well as to use such cash value and credit cards for the electronic payment of bills online. The disclosed apparatus additionally includes a handheld electronic device also providing such value transfer and bill payment services while traveling.

11 Claims, 4 Drawing Sheets

TELEBANKING APPARATUS FOR TRANSFERRING MONEY OR CASH VALUE BETWEEN TWO PARTIES IN THE SAME COUNTRY OR ACROSS NATIONAL BORDERS, FOR PAYING BILLS AND BROWSING THE INTERNET

CROSS REFERENCE TO RELATED APPLICATIONS

This application claims priority to co-pending U.S. Provisional Patent Application having Ser. No. 60/703,353 filed Jul. 28, 2005 entitled "Printomatik II", having a common applicant herewith.

FIELD OF THE DISCLOSURE

The disclosures made herein relate generally to apparatus for performing monetary transactions from remote dispersed locations and, more particularly, to apparatus for transferring cash value or monetary value between two parties, either nationally or across national borders, and to machines equipped to receive, store and transfer cash value to or from electronic cash value cards, credit cards, debit cards and the like, as well as to use such cash value and credit cards for the electronic payment of bills online. The disclosed apparatus additionally includes a handheld electronic device also providing such value transfer and bill payment services while traveling.

BACKGROUND

Bills may be paid and financial transactions conducted without the use of or exchange of physical currency. For example, it is known and practiced today to conduct financial transactions such as purchases and bill payments by the use of bank or other agency credit cards, as well as the use of debit cards linked to bank account numbers. For example, purchases are frequently made on the Internet or at retail shops using 'plastic' cards such as credit cards. It is also known and practiced today to transfer monetary value between two disparate bank accounts, as well as to conduct electronic payment of bills and invoices, these transactions conducted over the Internet network backbone by users having access to computer equipment and Internet banking accounts with banks and financial institutions offering such Internet banking services.

Credit and debit cards are generally issued by banks or other financial institutions and are provided with marking on the front side identifying the card issuer, the card owner, the credit card account number and an expiration date, among other things. Such marks are usually provided as embossed characters enabling the card to make impressions on credit card purchase slips and the like. It is known for credit cards and debit cards to have account information stored electronically also and for retail establishments to have electronic means of reading the encoded electronic account information from the card to register it and complete an account debit or credit transaction. Account information may be encoded on the credit or debit card using any variety of know and practiced methods including storage of electronic account information in magnetic domains written to a magnetic strip on the back of the card, as well as the newer technology "smart cards" which have a programmable read/write memory chip embedded into the card wherein the chip stores and retains the account information, cash value information or other information. Either variety of card (magnetic strip or smart card) is adaptable for use as an electronic cash value card. For example, one variety of cash value card is in common use today in certain service establishments such as Laundromats where the user 'recharges' the cash value card at a recharge station in the store with currency such as dollar bills, and the cash value is stored to the value card. The value transfer card is then inserted into laundry machines to pay for wash and dry cycles and the machines deduct the cash value directly from the value transfer card.

It is known to transfer monetary value between two parties using electronic transfers or wire transfers between two bank accounts, most frequently between bank accounts in two separate banking entities. It is also known to transfer cash value across one country or internationally using wire transfer service providers such as Western Union, for example. Such transfers involve an intermediate party whose role is to enable the transaction from end to end, and such a service typically exacts a fee.

There is a need however for a telebanking apparatus for transferring money or cash value between two parties in the same country or across national borders that operates more independent of third party enablers and that permits two parties to securely exchange or transfer cash value over the global Internet network, wherein the cash value is transferred from a cash value card or credit card to another party over the Internet and stored to a cash value card, wherein the cash value on the card is available to pay various bills electronically as well as for making purchases through Internet retailers or other brick and mortar retailers.

There is also a need for a telebanking apparatus that is adapted for high speed connection to the Internet using a variety of network connection means, for example but not limited to, direct DSL connection using an internal DSL modem, direct connection to a cable Internet service using an internal cable modem, conventional phone data modem for connection using conventional dialup Internet services over conventional copper phone lines, as well as Internet connection through data packet services over cellular network service providers.

There is also a need for a telebanking apparatus that replaces standard phone equipment, providing superior services to phone equipment, and includes wireless phone handset and personal digital assistant (PDA) type electronic devices equipped to provide Internet browsing and Internet cash value transfer functions.

Therefore, a telebanking apparatus for overcoming the drawbacks of such conventional approaches for providing cash value transfer between parties over the Internet would be useful, advantageous and novel.

SUMMARY OF THE DISCLOSURE

In one or more embodiments of the inventive disclosures made herein, a telebanking apparatus for transferring money or cash value between two parties in the same country or across national borders, for paying bills and browsing the Internet comprises an electronic system base module configured for placing upon and use upon a desktop. The base module comprises an electrical power supply for powering components in the base module; a microprocessor based logic system secured within the base module and powered by the power supply; a non-volatile read/write storage means interfaced to the microprocessor logic system, the storage means for storing software applications and data, the storage means secured within the base module. The base module further comprises a telephone jack secured to a side of the base module for connecting the telebanking apparatus to standard copper phone lines; a telephone modem interfaced to the microprocessor based logic system and electrically connected to the telephone jack wherein the modem is secured within the base module. The base module also having standard telephone device electronics contained within the base module, the telephone device electronics having incoming call alert, dial out and call answer capabilities. The telephone device is electrically connected to the telephone jack. The system base module also having one or more audio speakers and microphone devices secured to the base module wherein one function of the audio speakers and microphone is to provide speakerphone capabilities. The system base module further has a USB port secured to side of the base module with the USP port electrically interfaced to the microprocessor based logic system. A 10/100 base T network port is secured to the side of the base module, the network port is interfaced to the microprocessor logic system such that the network port provides one means of connecting the telebanking apparatus to the Internet. A DSL modem is secured within the base module. The DSL modem is electrically interfaced to the telephone jack as well as interfaced to the microprocessor based logic system thereby providing with the system base module a means of connecting with a DSL service provider to provide a high speed connection to the Internet. The system base module further comprises a credit card reader device/value card read/write device, wherein the card read/write device is configured to read credit card information for online purchases or cash value transfer, wherein the card read/write device is configured to readably deduct cash value from and add cash value to cash value transfer cards. The card read/write device is adapted to work with credit cards and value transfer cards employing conventional electronic account methods including magnetic strip and "smart card" chips.

The system base module includes a hatch hingably attached along one edge to a top portion of the base module, the hatch hingably pivotable between an angled upright open position and a closed position wherein in the closed position the hatch pivots to position a bottom face of the hatch in a facing relationship with the top portion of the base module. The hatch comprises a backlit LCD graphic display screen secured to a top face of the hatch. The LCD screen has touch screen input capabilities. The hatch further has a biometric finger print scanning input device secured to the top face of the hatch, the biometric device for authenticating the user to enable telebanking apparatus for use and to provide secure user identity for financial transactions. The hatch includes a means of removably attaching a PDA to a bottom face of the hatch, wherein the PDA is attached to the hatch when the hatch is in the open position, and while in the open position the PDA is angled to generally face the front of the system module and face the user. On the hatch an electrical connector is secured to a portion of the hatch, the electrical connector is positioned and configured to electrically connect the PDA to the system base module when the PDA is attached to the hatch such that the PDA battery is recharged through the connector from the base module power supply.

One or more wireless antennas are secured to the top portion of the base module, the antennas providing wireless radio frequency communication between the base module and the detachable devices, namely the cordless phone handset and the PDA discussed above. A key lock device is secured to the top portion of the base module with the key lock device lockably engaging the hatch to lock the hatch in the closed position for added security. A cordless phone handset is sized and configured to detachably rest upon the base module spanning over the hatch when the hatch is in the closed position, the cordless phone handset is in wireless communication with the telephone device electronics in the base module.

The system base module further includes the following user input devices. A stylus feather pen having a lower portion removably receivable into a depression in the top portion of the base module where the stylus feather pen is adapted for performing touch sensitive input and writing upon the LCD graphic display screen of either the LCD screen of the hatch as well as the LCD screen of the PDA device. The system base module also includes a second stylus feather pen having a lower portion removably receivable into a depression in the top portion of the base module. The second stylus pen has an infrared LED device and infrared light detector for scanning barcodes on bills. Also the second stylus feather pen is provided with a tip adapted for performing touch sensitive input and writing on the LCD graphic screens.

In any value transfer system it is important that the system and protocols used to exchange information over the Internet are secure. Several cryptographic schemes are known and successfully applied in the known art. One common scheme, for an enabling example, is a variant of the Data Encryption Standard (DES). In cryptography, Triple DES is a block cipher formed from the Data Encryption Standard (DES) cipher by using it three times. Triple DES is also known as TDES or, more standard, TDEA Triple Data Encryption Algorithm. IBM discovered that 56-bit key of DES is not enough to guard against brute force attacks, so TDES was chosen as a simple way to enlarge the key space without a need to switch to a new algorithm and to provide strong security. TDES has an encryption key length of 168 bits. Many other suitable encryption technologies are known and practiced in the art.

It is an object of the invention to provide a telebanking apparatus which enables the transferring of money or cash value between two parties in the same country or across national borders that is equipped with a credit card reader, wherein the credit card information from the reader may be applied to the electronic payment of bills or for purchases made over the Internet.

It is an object of the invention to provide a telebanking apparatus that is adapted to support the accumulation disbursement of cash value on cash value cards, and a telebanking apparatus providing for the exchange of currency cash value between two parties connected over an Internet network connection.

It is an object of the invention to provide a telebanking electronic cash value/value transfer card that promotes the identification status of an individual on its electronic cash value card for departure, arrival or reentry to a country and for government purposes to regulate banking. The identification status may include, among other things, full name, date of birth, citizenship, permanent residence and other identification information as government customs regulations may require.

It is an object of the invention to provide a telebanking apparatus with a system base module having a PDA docking station on a hatch, the docking station integrating the PDA with the telebanking system base module, the PDA providing application software and screens enabling web browsing, electronic bill payment, encryption for financial transactions such as value transfer, cash value transfer, credit card reader support, mobile phone capabilities including the ability to originate and receive packet data over a wireless cellular or mobile phone network, as well as a biometric finger printer scanner and related software for secure identification of the user to prevent fraudulent use.

It is an object of the invention to provide a telebanking apparatus with a system base module styled and adapted for placement and use on a desktop, the apparatus having standard telephone capabilities together with Internet network connection technologies including an integrated cable modem, a DSL modem, and a conventional phone modem for dialup access, as well as a wireless phone handset.

It is an object of the invention to provide a telebanking apparatus having and requiring the use of biometric finger print activation and identification of the owner for activation of softkeys and functions on both the system base module and the PDA unit.

It is an object of the invention to provide a telebanking apparatus wherein the LCD screens are touch input sensitive, and wherein the LCD screens are provided with software generated soft function keys located around the margins of the screen, wherein the soft function keys are selectable by the use of the stylus, and wherein the soft function keys enable, execute and direct various features of the telebanking apparatus.

It is an object of the invention to provide a telebanking apparatus having facsimile reception and display capabilities to the PDA and display screen on the system module base hatch as well as capabilities to print a FAX to a printer connected to the USB port on the apparatus.

It is an object of the invention to provide a telebanking apparatus having printout capabilities to a printer connected to a USB port provided on the system base module.

It is an object of the invention to provide a telebanking apparatus that by design concept provides a convenient way to send money anywhere in the world and is secured to use only by the owner via an integrated biometric finger print scanning device.

These and other objects and embodiments of the inventive disclosures made herein will become readily apparent upon further review of the following specification and associated drawings.

BRIEF DESCRIPTION OF THE DRAWINGS

The drawings show a form of the invention that is presently preferred; however, the invention is not limited to the precise arrangement shown in the drawings.

DETAILED DESCRIPTION OF THE DRAWINGS

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein.

Figure 1:
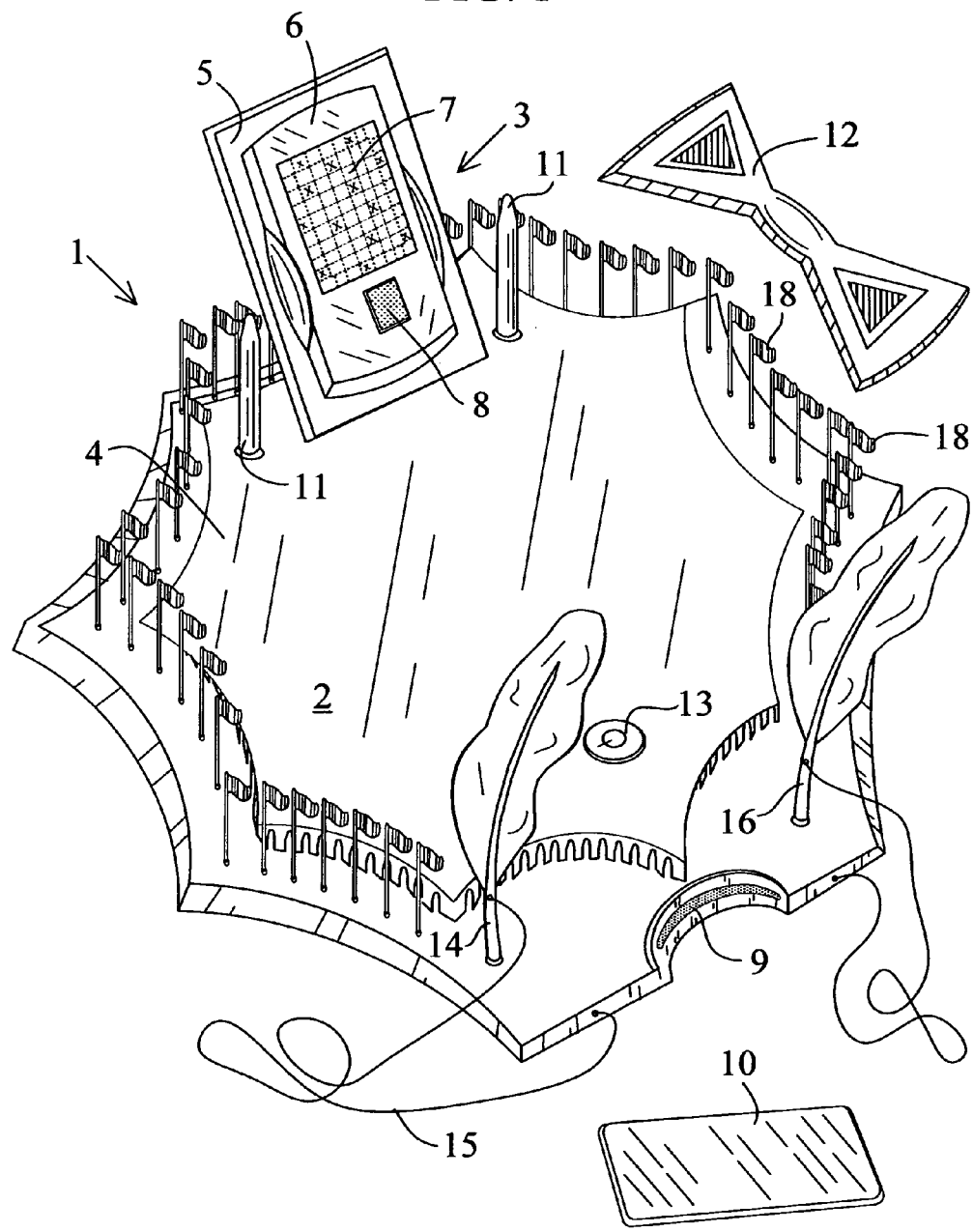
FIG. 1 depicts a perspective view of one embodiment of a telebanking apparatus in accordance with the inventive disclosures herein. The observer located above and to the front and left of the telebanking apparatus.
Figure 2:
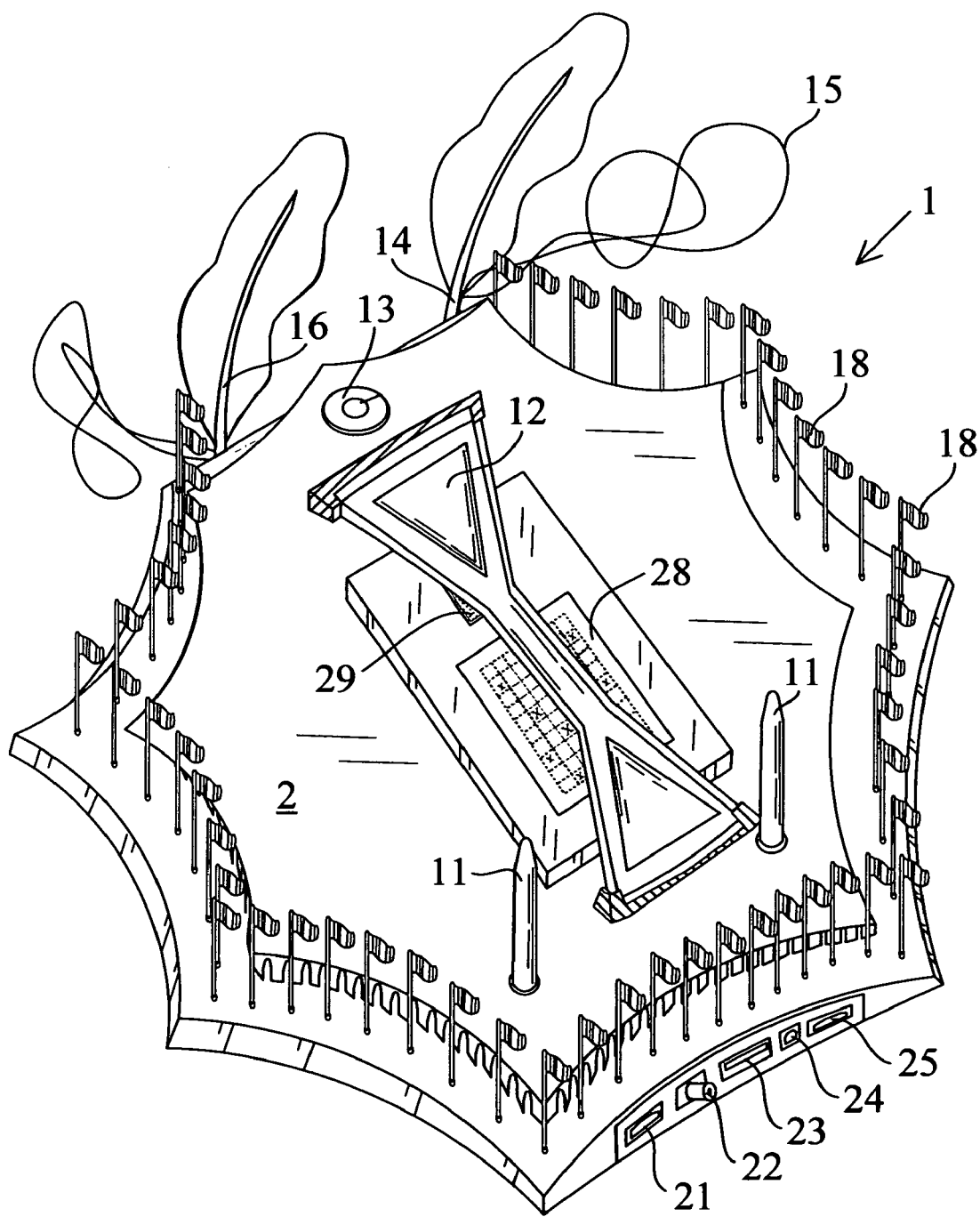
FIG. 2 depicts a perspective view of one embodiment of a telebanking apparatus in accordance with the inventive disclosures herein. The observer located above and to the rear and left of the telebanking apparatus, showing the back panel of the station with various network and phone interface connectors.

Turning now to FIG. 1 and FIG. 2:

FIG. 1 depicts a perspective view of one embodiment of a telebanking apparatus in accordance with the inventive disclosures herein. The observer located above and to the front and left of the telebanking apparatus. FIG. 2 depicts a perspective view of one embodiment of a telebanking apparatus in accordance with the inventive disclosures herein. The observer located above and to the rear and left of the telebanking apparatus, showing the back panel of the station with various network and phone interface connectors. Telebanking apparatus 1 has a system base module 2 or cradle station configured for placement upon and use upon a desk, tabletop or other flat work surface. A hatch 3 is hingeably connected at a lower edge of the hatch to a top surface 4 of the system base module 2, the hatch hingably pivotable between an angled upright open position and a closed position wherein the closed position the hatch pivots to position a bottom face 5 of the hatch in a facing relationship with the top portion 4 of the base module 2. A handheld electronic PDA device 6 is removably secured to the bottom face 5 of the hatch, the PDA having mobile phone capabilities and wireless networking capabilities. The PDA includes a backlit LCD graphic display screen 7 secured to a front face of the PDA 6, the screen 7 having touch screen input capabilities for data entry into the PDA. The PDA 6 includes a biometric finger print scanning input device 8 secured to the front face of the PDA 6, the biometric device 8 for authenticating the user to enable the PDA for use. The PDA 6 further includes a card swipe type card read/write device (not shown) accessible at the rear of the PDA 6, wherein the card read/write device is configured to read credit card information for online purchases or cash value transfer and wherein the card read/write device is configured to readably deduct cash value from as well as add cash value to cash value transfer cards. The card read/write device is adapted to work with credit cards and value transfer cards employing conventional electronic account methods including magnetic strip and "smart card" chips. The system base module 2 or cradle station includes a card read/write device accessed through a card insertion slot 9 at the front of the system base module. The system base module card read/write device is configured to read credit card information for online purchases or cash value transfer, wherein the card read/write device is configured to readably deduct cash value from and add cash value to cash value transfer cards, wherein the card read/write device is adapted to work with credit cards and value transfer cards employing conventional electronic account methods including magnetic strip and "smart card" chips. Typical credit cards, debit cards or value transfer cards 10 are insertable and removable from the system base module through card slot 9. Two wireless antennas 11 are secured to the top portion 4 of the base module 2, the antennas 11 providing wireless radio frequency communication between the base module and detachable devices, namely, a cordless phone handset 12 and the PDA 6. The antennas 11 are also connected to the wireless network hub or router contained within the system base module 2 of the telebanking apparatus. A key lock device 13 is secured to a top portion 4 of the base module 2. The key lock device 13 lockably engages the hatch to lock the hatch in the closed position for added security. The cordless phone handset 12 is sized and configured to detachably rest upon the base module 2 spanning over the hatch 3 when the hatch is in the closed position upon the top of the system base module. The cordless phone handset 12 is in wireless communication with the telephone device electronics in the system base module 2. A stylus feather pen 16 has a lower portion removably receivable into a depression in the top portion of the base module 2. The stylus feather pen 16 is adapted for performing touch sensitive input and writing upon the LCD graphic display screens, wherein the stylus serves as a user input device. A second stylus feather pen 14 has a lower portion removably receivable into a depression in the top portion of the base module 2. The second stylus feather pen is equipped and adapted for performing touch sensitive input and writing upon the LCD graphic display screen 28 of the hatch 6 as well as the LCD screen 7 of the PDA 6 wherein the stylus serves as a user input device. Located on the hatch near the LCD graphics screen 28 is the biometric fingerprint scan and identification device 29, performing a similar function to the biometric device 8 of the PDA. The second stylus pen 14 also has an infrared light emitting LED device and infrared light detector built into the tip of the second stylus, the infrared light and detector serving as an input device for scanning barcodes on bills, for example. The infrared LED device and detector are electrically connected to electronics within the system base module by flexible multi-conductor electrical cable 15. A plurality of miniature silver colored flagpoles with flags attached 18 are secured to the top portion of the base module 2. The flag poles 18 are spaced and secured proximate to sides of the base module.

Looking only at FIG. 2, the rear face of the telebanking apparatus in accordance with the inventive disclosures herein has connectors for a standard telephone phone jack for connecting the system base module to a standard copper phone line 21, cable television cable signal input 22, a standard PC universal serial port (USB) 23, power jack into which a DC power supply plugs 24 to provide power to the telebanking apparatus, and a 10/100 base T network cable port 25.

Figure 3:
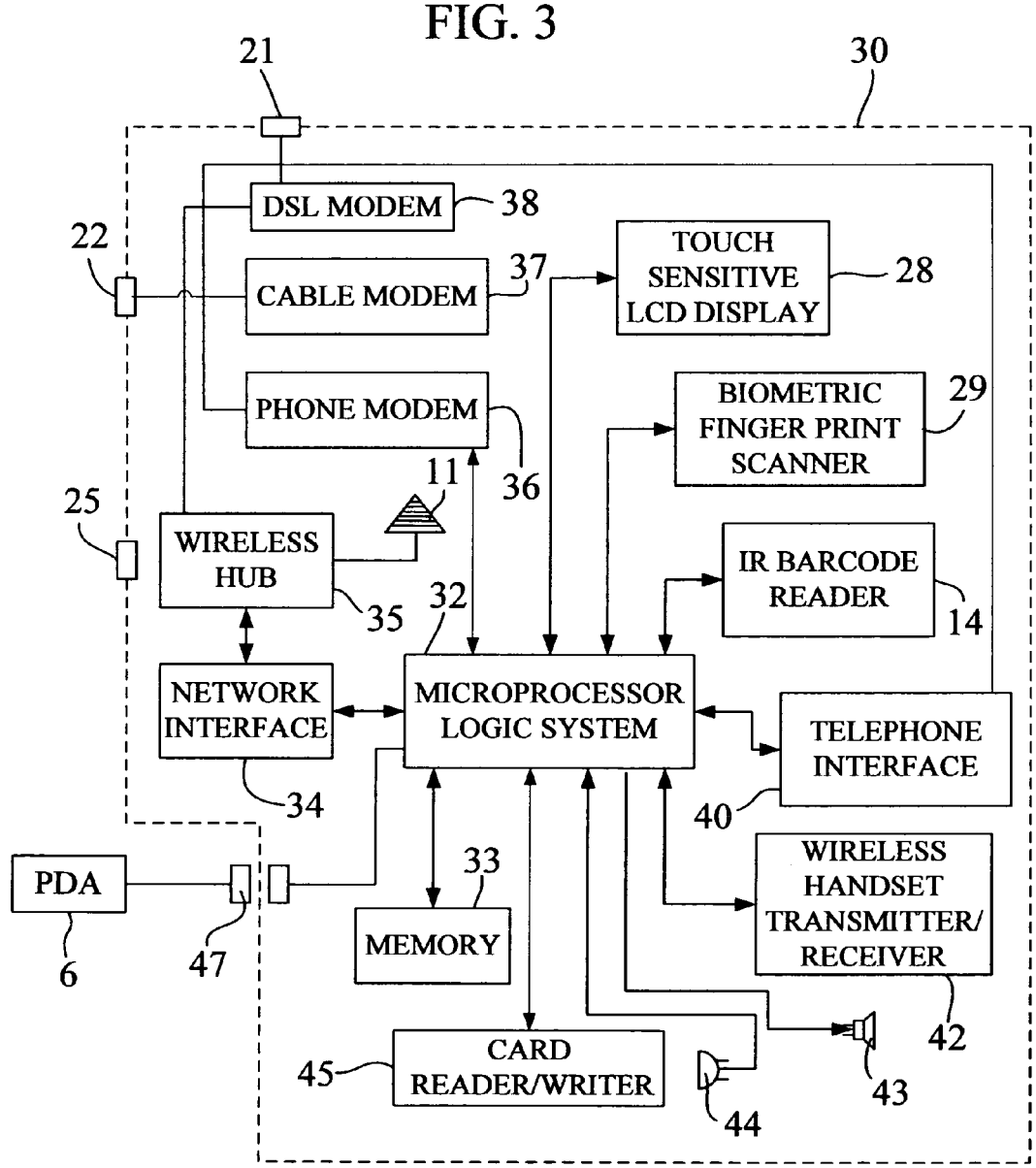
FIG. 3 depicts a block diagram of the functional modules which is secured within or upon the system base module of one embodiment of the telebanking apparatus in accordance with the inventive disclosures herein.

Turning now for FIG. 3. FIG. 3 depicts a block diagram of the interconnected functional modules which cooperate to implement the functionality of the telebanking apparatus. Dotted boundary line 30 identifies functional modules which are secured within or otherwise secured to the system base module, also called the cradle or PDA charging station. Microprocessor based logic system 32 is interconnected to and communicates with multiple devices and function blocks as shown and discussed below. Microprocessor based logic system 32 executes operating system software and applications stored in memory 33, as well reads and stores data from and to the memory 33. Memory 33 comprises random access memory, flash memory or other non-volatile memory, as well as other programmatic and data storage means such as a hard drive. The microprocessor based logic system 32 is connected to the Internet through a network interface module 34 which is interconnected with and in communication with the wireless hub 35. Cable modem 37 and phone DSL modem 38 have network interfaces connected to the wireless hub 35, sharing the Internet connection with the PDA as well as other computers within wireless networking range. Cable model 37 is electrically connected to cable connection receiving plug 22 located on the rear of the system base module. Phone jack 22 located on the read of the system base module is connected to the DSL modem 38, the phone modem 36 (for dialup Internet access if high speed access is not available) and to the telephone interface module 40. Telephone interface module 40 provides the interface electronics for initiating, dialing and receiving phone calls and interfacing calls to the microprocessor based logic system. Speech/audio input and output for telephone use is directed through the wireless handset transmitter/receiver 42 which is in communication with the wireless handset 12 as depicted in FIG. 2. Telephone audio input and output can also be directed through the speaker 43 and microphone 44 to provide speakerphone capabilities. Whether the telephone uses the speakerphone capabilities or the wireless handset is under control of the microprocessor based logic system 32. The wireless network hub 35, discussed earlier, is connected to 10/100 base T network port (FIG. 2 port 25) located on the rear of the system base module. Wireless hub 35 is electrically connected to wireless antennas (11 on FIG. 2 ) providing a wireless network signal to the PDA as well as nearby computers. The system base module has a color graphic backlit screen (28 on FIG. 2) secured to the hatch on the system base module. The screen 28 has software generated selective operation touch keys displayed around the border of the screen. The screen 28 is a touch sensitive screen and serves as an input/output device. Software executing on the microprocessor logic system 32 provides handwriting recognition capabilities, allowing the user to write on the screen 28 using one of the feather pen stylus discussed earlier. Alternately a touch sensitive graphic keyboard is displayable on the screen and may be used with a stylus for input. The biometric finger print scanner (29 on FIG. 2) is interfaced to the microprocessor logic system providing finger print recognition capabilities for security and positive user identification. Infrared barcode scanner (14 FIG. 1) provided on the tip of a stylus pen is interfaced to the microprocessor based logic system 32, where the IR reader 14 is useful for such tasks as scanning barcodes from bills for payment. The credit card/value card read/write device 45 is interfaced to the logic system 32. The read/write device 45 is located behind the card access slot (9 FIG. 1) of the system base module. The PDA (6 FIG. 1) interfaces to the system base microprocessor logic system 32 through docking connector 47 having a first portion on the PDA and a mating second portion secured to the hatch (5 FIG. 2), provide data communication between the PDA and the system base module while the PDA is docked to the hatch of the base module. Batteries in the PDA are also charged through the connector 47 from the DC power supply of the system base module.

Figure 4:
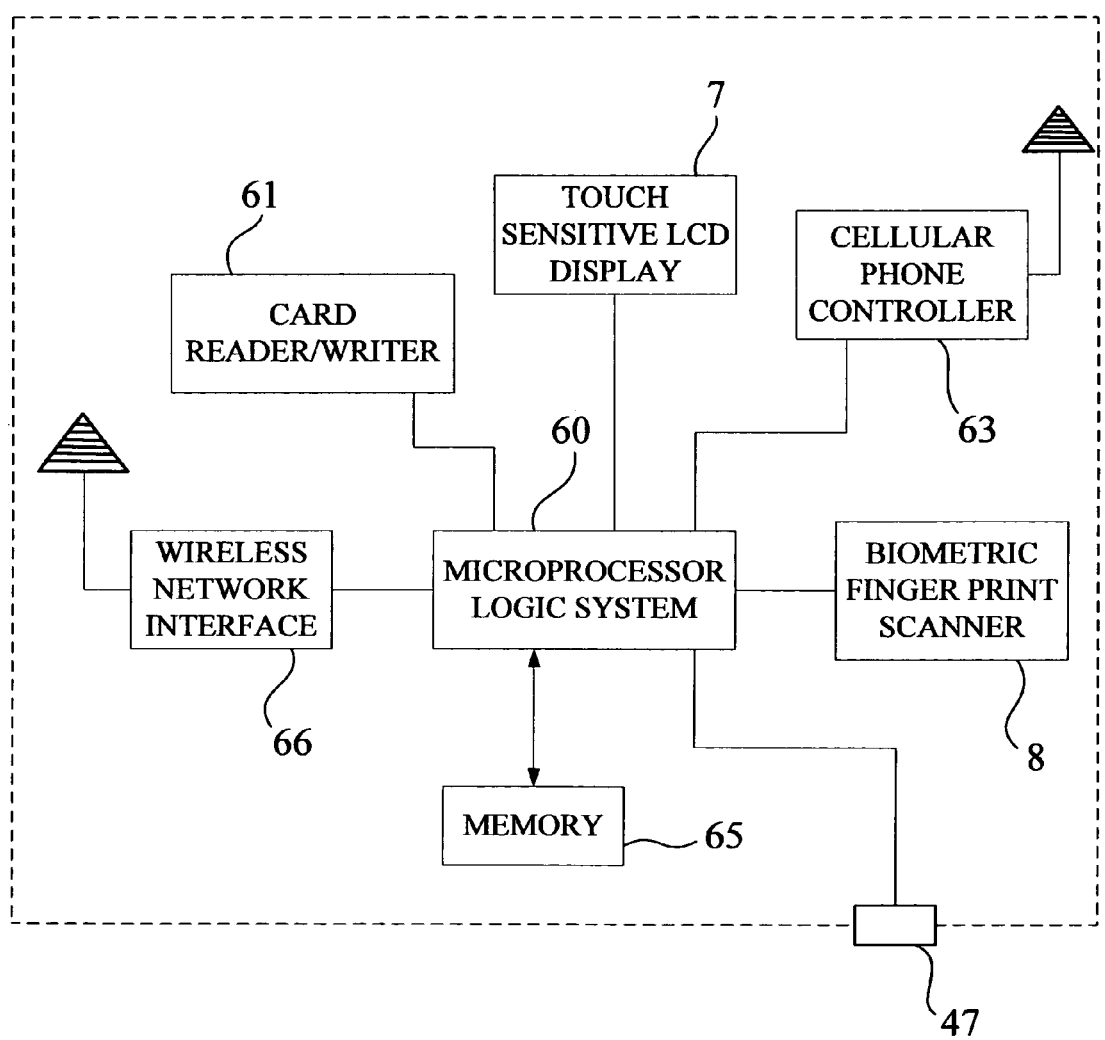
FIG. 4 depicts the major functional blocks of the detachable PDA according to one embodiment of the telebanking apparatus in accordance with the inventive disclosures herein.

FIG. 4 depicts the major functional blocks of the detachable PDA according to one embodiment of the telebanking apparatus in accordance with the inventive disclosures herein. Microprocessor based logic system 60 is interconnected to and communicates with multiple devices and function blocks as shown and discussed below. Microprocessor based logic system 60 executes operating system software and applications stored in memory 65, as well reads and stores data from and to the memory 65. Memory 365 comprises random access memory, flash memory or other non-volatile memory as typically used in a PDA. The microprocessor based logic system 60 is connectable to the Internet through either the wireless network interface 66, compatible with wireless 'hotspots', or through the cellular phone controller 63 via a packet data connection over a cellular or mobile service provider. Touch sensitive screen (7 on FIG. 1) is both a graphic display device and a touch screen input device. Software executing on the microprocessor logic system 60 provides handwriting recognition capabilities, allowing the user to write on the screen 7 using a stylus. Alternately a touch sensitive graphic keyboard is displayable on the screen and may be used with a stylus for input. The biometric finger print scanner (8 on FIG. 1) is interfaced to the microprocessor logic system providing finger print recognition capabilities for security and positive user identification. The PDA also functions as a standard cellular phone through the cellular phone controller 63 and internal microphone and speaker. The credit card/value card read/write device 61 is interfaced to the logic system 60. The read/write device 461 is secured to a rear portion of the PDA housing and provides credit card reading and value transfer capabilities similar to the capabilities of the system base module, but adapted for use while traveling.

The discussed construction, illustrations and sequence of operation is for one embodiment of the invention, but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, and mechanical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A telebanking apparatus for transferring money or cash value between two parties in the same country or across national borders, for paying bills and browsing the Internet, the apparatus comprising:

a handheld electronic personal digital assistant (PDA) device having mobile phone and wireless network capabilities, the PDA comprising:

a microprocessor based logic system;

a memory means for storing an operating system, application to execute on the logic system of the PDA, and for storage of data;

a mobile phone transmitter and receiver interfaced to the logic system of the PDA, the mobile phone equipped to originate and receive phone calls, as well as to transmit and receive packet data over a mobile telephone network;

a card swipe type card read/write device secured to the PDA, wherein the card read/write device is configured to read credit card information for online purchases or cash value transfer, wherein the card read/write device is configured to readably deduct cash value from and add cash value to cash value transfer cards, wherein the card read/write device is adapted to work with credit cards and value transfer cards employing conventional electronic account methods including magnetic strip and smart card chips;

a backlit liquid crystal display (LCD) graphic display screen secured to a front face of the PDA, the screen having touch screen input capabilities;

a biometric finger print scanning input device secured to the front face of the PDA, the biometric device for authenticating the user to enable the PDA for use, the biometric device interfaced to the PDA logic system;

a user input stylus for performing touch sensitive input and writing on the PDA LCD graphic screens, the stylus removably attached to the PDA; and cash value transfer, transaction encryption, electronic payment, handwriting recognition and Internet browsing software stored to the memory means and executable upon the PDA logic system;

an electronic system base module configured for placing upon and use upon a desktop, the base module comprising:

an electrical power supply for powering components in the base module;

a microprocessor based logic system secured within the base module and powered by the power supply;

a non-volatile read/write storage means interfaced to the microprocessor logic system, the storage means for storing software applications and data, the storage means secured within the base module;

a telephone jack secured to a side of the base module;

a telephone modem interfaced to the microprocessor based logic system and electrically connected to the telephone jack, the modem secured within the base module;

telephone device electronics having incoming call alert, dial out and call answer capabilities, the telephone device electrically connected to the telephone jack;

audio speaker and microphone devices secured to the base module, the audio speaker and microphone providing speakerphone capabilities;

a universal serial bus (USB) port secured to side of the base module, the USB port electrically interfaced to the microprocessor based logic system;

a 10/100 base T network port secured to side of the base module, the network port interfaced to the microprocessor logic system, the network port for connecting the telebanking apparatus to the Internet;

a digital subscriber tine (DSL) modem secured within the base module, the DSL modem electrically interfaced to the telephone jack, the DSL modem interfacing the microprocessor based logic system to a DSL service provider providing connection to the Internet;

a wireless network hub secured within the base module, the hub providing wireless network access to personal computers and other devices through the telebanking apparatus;

a card read/write device, wherein the card read/write device is configured to read credit card information for online purchases or cash value transfer, wherein the card read/write device is configured to readably deduct cash value from and add cash value to cash value transfer cards, wherein the card read/write device is adapted to work with credit cards and value transfer cards employing conventional electronic account methods including magnetic strip and smart card chips;

a hatch hingably attached along one edge to a top portion of the base module, the hatch hingably pivotable between an angled upright open position and a closed position wherein the hatch is pivoted so as to position a bottom face of the hatch in a facing relationship with the top portion of the base module when the hatch is in the closed position, the hatch comprising:

a backlit LCD graphic display screen secured to a top face of the hatch, the screen having touch screen input capabilities;

a biometric finger print scanning input device secured to the top face of the hatch, the biometric device for authenticating the user to enable telebanking apparatus for use;

a means of removably attaching the PDA to a bottom face of the hatch, wherein the PDA is attached to the hatch when the hatch is in the open position; and an electrical connector secured to the hatch, the connector positioned and configured to electrically connect the PDA to the system base module when the PDA is attached to the hatch, wherein the PDA battery is recharged through the connector from the base module power supply;

one or more wireless antennas secured to the top portion of the base module, the antennas providing wireless radio frequency communication between the base module and detachable devices namely a cordless phone handset and the PDA, as well as the wireless network hub;

a key lock device secured to a top portion of the base module, the key lock device lockably engaging the hatch to mechanically lock the hatch in the closed position; and cash value transfer, electronic payment, transaction encryption, handwriting recognition and Internet browsing software stored to the memory means and executable upon the logic system of the system base module;

cordless phone handset sized and configured to detachably rest upon the base module spanning over the hatch when the hatch is in the closed position, the cordless phone handset in wireless communication with the telephone device electronics in the base module;

one or more cash value transfer cards, the cash value transfer cards have a rewritable data storage means, the cards sized and adapted for use with the telebanking apparatus;

a stylus feather pen, the stylus pen having a lower portion removably receivable into a depression in the top portion of the base module, the stylus feather pen adapted for performing touch sensitive input and writing upon the LCD graphic display screens, wherein the stylus serves as a user input device; and a second stylus feather pen having a lower portion removably receivable into a depression in the top portion of the base module, the second stylus pen having an infrared light emitting diode (LED) device and infrared light detector secured to a tip of the second stylus, the infrared LED device and detector for scanning barcodes on bills, the second stylus feather pen having a tip adapted for performing touch sensitive input and writing on the LCD graphic screens.

2. The telebanking apparatus of claim 1, wherein:
the memory means of the base module further comprises applications for facsimile send and receive; and
the memory means of the PDA comprises applications for facsimile send and receive.

3. The telebanking apparatus of claim 2, wherein the transaction encryption algorithm comprises a triple data encryption standard (DES) encryption algorithm.

4. The telebanking apparatus of claim 3, wherein the means of providing cordless communication between the base module and the cordless handset comprises peer to peer Blue Tooth networking protocol.

5. The telebanking apparatus of claim 4, wherein the system base module comprises a hard drive for storing applications and data.

6. The telebanking apparatus of claim 1, wherein the value transfer card promotes the identification status of an individual for departure, arrival and reentry to a country and for government purposes to regulate banking.

7. A telebanking apparatus for transferring money or cash value between two parties in the same country or across national borders, for paying bills and browsing the Internet, the apparatus comprising:

a handheld electronic personal digital assistant (PDA) device having mobile phone and wireless network capabilities, the PDA comprising:

a microprocessor based logic system;

a memory means for storing an operating system, application to execute on the logic system of the PDA, and for storage of data;

a mobile phone transmitter and receiver interfaced to the logic system of the PDA, the mobile phone equipped to originate and receive phone calls, as well as to transmit and receive packet data over a mobile telephone network;

a card swipe type card read/write device secured to the PDA, wherein the card read/write device is configured to read credit card information for online purchases or cash value transfer, wherein the card read/write device is configured to readably deduct cash value from and add cash value to cash value transfer cards, wherein the card read/write device is adapted to work with credit cards and value transfer cards employing conventional electronic account methods including magnetic strip and smart card chips;

a backlit liquid crystal display (LCD) graphic display screen secured to a front face of the PDA, the screen having touch screen input capabilities;

a biometric finger print scanning input device secured to the front face of the PDA, the biometric device for authenticating the user to enable the PDA for use, the biometric device interfaced to the PDA logic system;

a user input stylus for performing touch sensitive input and writing on the PDA LCD graphic screens, the stylus removably attached to the PDA; and cash value transfer, transaction encryption, electronic payment, handwriting recognition and Internet browsing software stored to the memory means and executable upon the PDA logic system;

an electronic system base module configured for placing upon and use upon a desktop, the base module comprising:

an electrical power supply for powering components in the base module;

a microprocessor based logic system secured within the base module and powered by the power supply;

a non-volatile read/write storage means interfaced to the microprocessor logic system, the storage means for storing software applications and data, the storage means secured within the base module;

a telephone jack secured to a side of the base module;

a telephone modem interfaced to the microprocessor based logic system and electrically connected to the telephone jack, the modem secured within the base module;

telephone device electronics having incoming call alert, dial out and call answer capabilities, the telephone device electrically connected to the telephone jack;

audio speaker and microphone devices secured to the base module, the audio speaker and microphone providing speakerphone capabilities;

a universal serial bus (USB) port secured to side of the base module, the USB port electrically interfaced to the microprocessor based logic system;

a 10/100 base T network port secured to side of the base module, the network port interfaced to the microprocessor logic system, the network port for connecting the telebanking apparatus to the Internet;

a digital subscriber line (DSL) modem secured within the base module, the DSL modem electrically interfaced to the telephone jack, the DSL modem interfacing the microprocessor based logic system to a DSL service provider providing connection to the Internet;

a wireless network hub secured within the base module, the hub providing wireless network access to personal computers and other devices through the telebanking apparatus;

a card read/write device, wherein the card read/write device is configured to read credit card information for online purchases or cash value transfer, wherein the card read/write device is configured to readably deduct cash value from and add cash value to cash value transfer cards, wherein the card read/write device is adapted to work with credit cards and value transfer cards employing conventional electronic account methods including magnetic strip and smart card chips;

a hatch hingably attached along one edge to a top portion of the base module, the hatch hingably pivotable between an angled upright open position and a closed position, wherein the hatch is pivoted so as to position a bottom face of the hatch in a facing relationship with the top portion of the base module when the hatch is in the closed position, the hatch comprising:

a backlit LCD graphic display screen secured to a top face of the hatch, the screen having touch screen input capabilities;

a biometric finger print scanning input device secured to the top face of the hatch, the biometric device for authenticating the user to enable telebanking apparatus for use;

a means of removably attaching the PDA to a bottom face of the hatch, wherein the PDA is attached to the hatch when the hatch is in the open position; and an electrical connector secured to the hatch, the connector positioned and configured to electrically connect the PDA to the system base module when the PDA is attached to the hatch, wherein the PDA battery is recharged through the connector from the base module power supply;

a pair of wireless antennas secured to the top portion of the base module, the antennas providing wireless radio frequency communication between the base module and detachable devices namely a cordless phone handset and the PDA, as well as the wireless network hub;

a key lock device secured to a top portion of the base module, the key lock device lockably engaging the hatch to mechanically lock the hatch in the closed position; and cash value transfer, electronic payment, transaction encryption, handwriting recognition and Internet browsing software stored to the memory means and executable upon the logic system of the system base module;

cordless phone handset sized and configured to detachably rest upon the base module spanning over the hatch when the hatch is in the closed position, the cordless phone handset in wireless communication with the telephone device electronics in the base module;

one or more cash value transfer cards, the cash value transfer cards have a rewritable data storage means, the cards sized and adapted for use with the telebanking apparatus;

a stylus feather pen, the stylus pen having a lower portion removably receivable into a depression in the top portion of the base module, the stylus feather pen adapted for performing touch sensitive input and writing upon the LCD graphic display screens, wherein the stylus serves as a user input device;

a second stylus feather pen having a lower portion removably receivable into a depression in the top portion of the base module, the second stylus pen having an infrared light emitting diode (LED) device and infrared light detector secured to a tip of the second stylus, the infrared LED device and detector for scanning barcodes on bills, the second stylus feather pen having a tip adapted for performing touch sensitive input and writing on the LCD graphic screens; and a plurality of decorative flag poles attached to and extending above the top portion of the base module, wherein each one of said flag poles is provided in a spaced apart arrangement adjacent a respective side of the base module.

8. The telebanking apparatus of claim 7, wherein said antennas are secured to the top portion of the base module in spaced apart arrangement with said one edge of the hatch hingedly attached to the top portion of the base in a manner whereby the hatch is positioned between said antennas when the hatch is in the open position.

9. The telebanking apparatus of claim 8, wherein:

said stylus feather pens are in spaced apart relationship with respect to each other;

said first stylus receiving depression is positioned adjacent a first end portion of a front edge of the base module;

said second stylus receiving depression is positioned adjacent a second end portion of the front edge of the base module; and the card read/write device of the base module is accessible through a front edge portion thereof between said end portions of the front edge.

10. The telebanking apparatus of claim 9, wherein:

the means of removably attaching the PDA to the bottom face of the hatch is concealed between the top portion of the base module and the bottom face of the hatch when the hatch is in the closed position whereby the means of removably attaching the PDA is physically inaccessible when the hatch is locked in the closed position by the key lock device.

11. The telebanking apparatus of claim 10, wherein:

the telephone jack, the USB port and the 10/100 base T network port are accessible through a read edge portion of the base module.

* * * * *